UNITED STATES PATENT OFFICE.

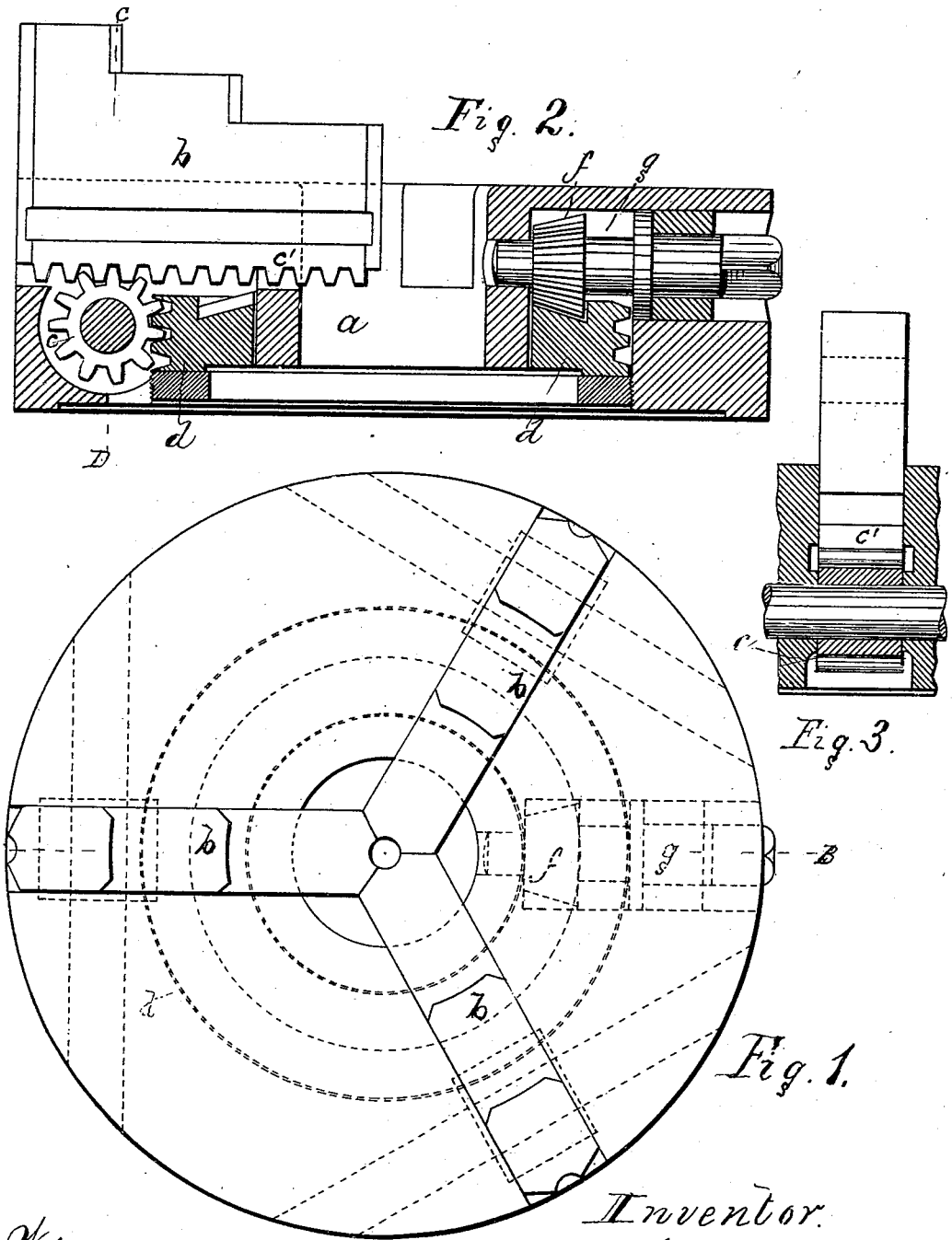

MORITZ KLEBER, OF BERLIN, GERMANY.

SELF-CENTERING DRILL-CHUCK.

SPECIFICATION forming part of Letters Patent No. 669,202, dated March 5, 1901.

Application filed May 31, 1900. Serial No. 18,538. (No model.)

*To all whom it may concern:*

Be it known that I, MORITZ KLEBER, a subject of the Emperor of Germany, and a resident of Berlin, in the Empire of Germany, have invented a new and useful Self-Centering Drill-Chuck, of which the following is a specification.

My invention relates to a new and useful drill-chuck embodying certain self-centering gear adapted by its novel construction to eliminate certain disadvantages experienced in those chucks of the same art which employ spirally-arranged driving grooves or teeth for the purposes of adjustment of the jaws.

In the accompanying drawings, in which similar letters of reference refer throughout to similar parts, Figure 1 is a plan view of a drill-chuck embodying my invention. Fig. 2 is a sectional view on the line A B of Fig. 1. Fig. 3 illustrates a sectional view on line C D of Fig. 2.

From the accompanying drawings it will be seen that a plurality of jaws $b$, preferably three in number, are mounted in suitable guides $a$, formed (approximately as illustrated) in the chuck-casing in the usual manner, and are adapted to be simultaneously moved toward a common center and grip the shank of a tool or work-stick therein inserted. For giving this simultaneous movement to the said jaws a new and useful gearing is employed. Formed in the said casing immediately below each of the said jaws and approximately as illustrated are suitable chambers, in each of which a pinion $c$ is mounted, adapted to engage with a rack $c'$, formed on the lower face of each of said jaws. A worm-gear $d$ is suitably journaled within the said casing and simultaneously gives when operated as hereinafter described a corresponding rotation to each of the said pinions, with which it is in constant engagement. Engaging said worm is a bevel-gear $f$, mounted on the inner end of a shaft $g$, which latter is adapted to be operated in any well-known manner.

By this construction the inaccuracies found after short use in chucks employing spiral grooved gearing between the jaws and the ring and occasioned by the necessary steep pitch of such gearing being so highly susceptible to the slightest wear and tear are here eliminated, inasmuch as a small pitch can be employed, while in addition thereto the strain and wear are equally distributed between the several pinions, thus maintaining the trueness of the jaws. The jaws are by this new construction also susceptible of the greatest expansibility, which in chucks with spiral gear was impossible, owing to the varying radii as the jaws were moved in and out, thus making it possible to employ my invention for holding all tools whose shanks can possibly enter the core of the chuck.

Having now described my invention, what I claim as new, and desire to protect by Letters Patent, is—

1. In a drill-chuck, the combination of radially-movable centering-jaws, racks on the under faces thereof, pinions meshing with said racks, a worm-gear disposed axially with relation to the center of the chuck, and a bevel-gear carried by a shaft at right angles to the axis of the worm-gear and engaging teeth on the worm-gear, as set forth.

2. In a drill-chuck, the combination of radially-movable centering-jaws, racks on the under sides thereof, pinions meshing with said racks, a worm-gear meshing with all of said pinions and having upon its upper face inclined gear-teeth, and a bevel-gear on a shaft at right angles to the axis of the worm-gear and meshing with the inclined gear-teeth of the said worm-gear, substantially as shown and described.

In testimony whereof I have hereunto set my hand, this 24th day of February, 1900, in the presence of two witnesses.

MORITZ KLEBER.

Witnesses:
HENRY HASPER,
WOLDEMAR HAUPT.